(12) United States Patent
Heath

(10) Patent No.: US 8,800,741 B2
(45) Date of Patent: Aug. 12, 2014

(54) CLUTCH LEVER FOR RACING CAR

(75) Inventor: Joseph Albert Heath, Rossville, IL (US)

(73) Assignee: Don Schumacher Racing Corporation, Mt. Prospect, IL (US)

( * ) Notice: Subject to any disclaimer, the term of this patent is extended or adjusted under 35 U.S.C. 154(b) by 278 days.

(21) Appl. No.: 13/091,574

(22) Filed: Apr. 21, 2011

(65) Prior Publication Data
US 2012/0267212 A1    Oct. 25, 2012

(51) Int. Cl.
     *F16D 43/10*      (2006.01)

(52) U.S. Cl.
     CPC ............... *F16D 43/10* (2013.01); *Y10S 192/01* (2013.01)
     USPC .................... 192/105 C; 192/70.13; 192/70.3; 192/99 A; 192/DIG. 1

(58) Field of Classification Search
     USPC ............. 192/70.13, 70.29, 70.3, 99 A, 105 C, 192/DIG. 1
     See application file for complete search history.

(56) References Cited

U.S. PATENT DOCUMENTS

| | | | |
|---|---|---|---|
| 851,956 A * | 4/1907 | McMahon ................. | 192/70.22 |
| 1,825,979 A * | 10/1931 | Reed ......................... | 192/110 B |
| 2,251,366 A * | 8/1941 | Miller et al. ............... | 192/70.22 |
| 2,253,294 A * | 8/1941 | Higgs ....................... | 192/105 CS |
| 2,406,244 A * | 8/1946 | Nutt ............................ | 192/99 A |
| 4,485,905 A | 12/1984 | Radbo et al. | |
| 5,785,163 A * | 7/1998 | Bell ............................ | 192/70.3 |
| 6,134,779 A | 10/2000 | Walker et al. | |
| 6,502,480 B1 | 1/2003 | Walker et al. | |
| 7,082,661 B2 | 8/2006 | Ijames et al. | |
| 7,448,481 B2 | 11/2008 | Kimes et al. | |
| 7,810,623 B2 | 10/2010 | Justus et al. | |
| 2006/0260904 A1* | 11/2006 | Fox et al. ................... | 192/105 C |

* cited by examiner

*Primary Examiner* — Richard M. Lorence
(74) *Attorney, Agent, or Firm* — Michael Stanley Tomsa; Katten Muchin Rosenman LLP

(57) ABSTRACT

A clutch lever for a centrifugal clutch applies axial pressure on one or more clutch disc assemblies as a function of the rotational speed of the engine. The clutch levers are formed with two pieces when joined together form a joint that opposes the shear force exerted on the contact surface when the clutch lever is applying axial forces against the clutch disc assemblies. One piece is formed as a replaceable nose piece or contact surface portion which obviates the need to replace the entire clutch lever when one becomes damaged. The other piece is complementary and is configured to be pivotably mounted with respect to the pressure plate, When the nose piece portion breaks, only one piece of the clutch lever needs to be replaced.

21 Claims, 14 Drawing Sheets

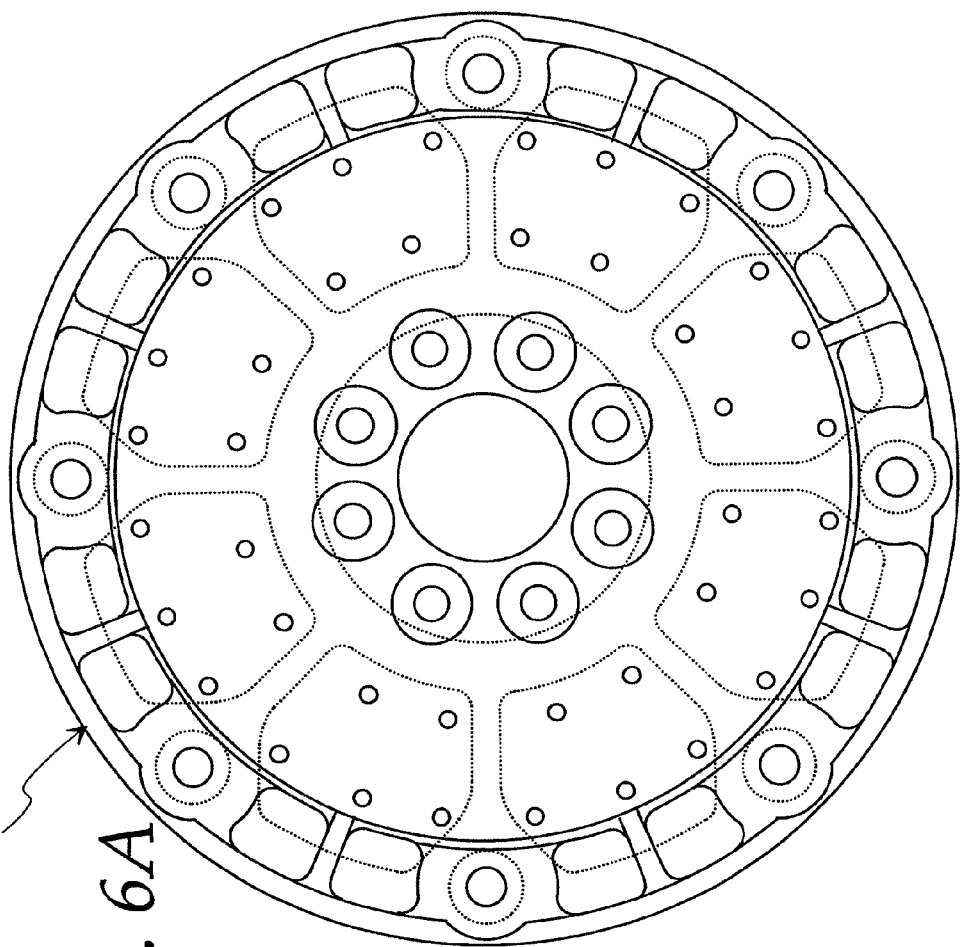

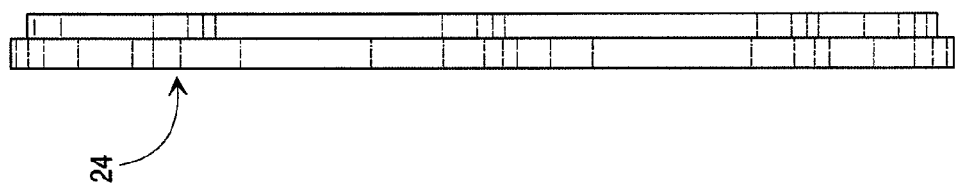
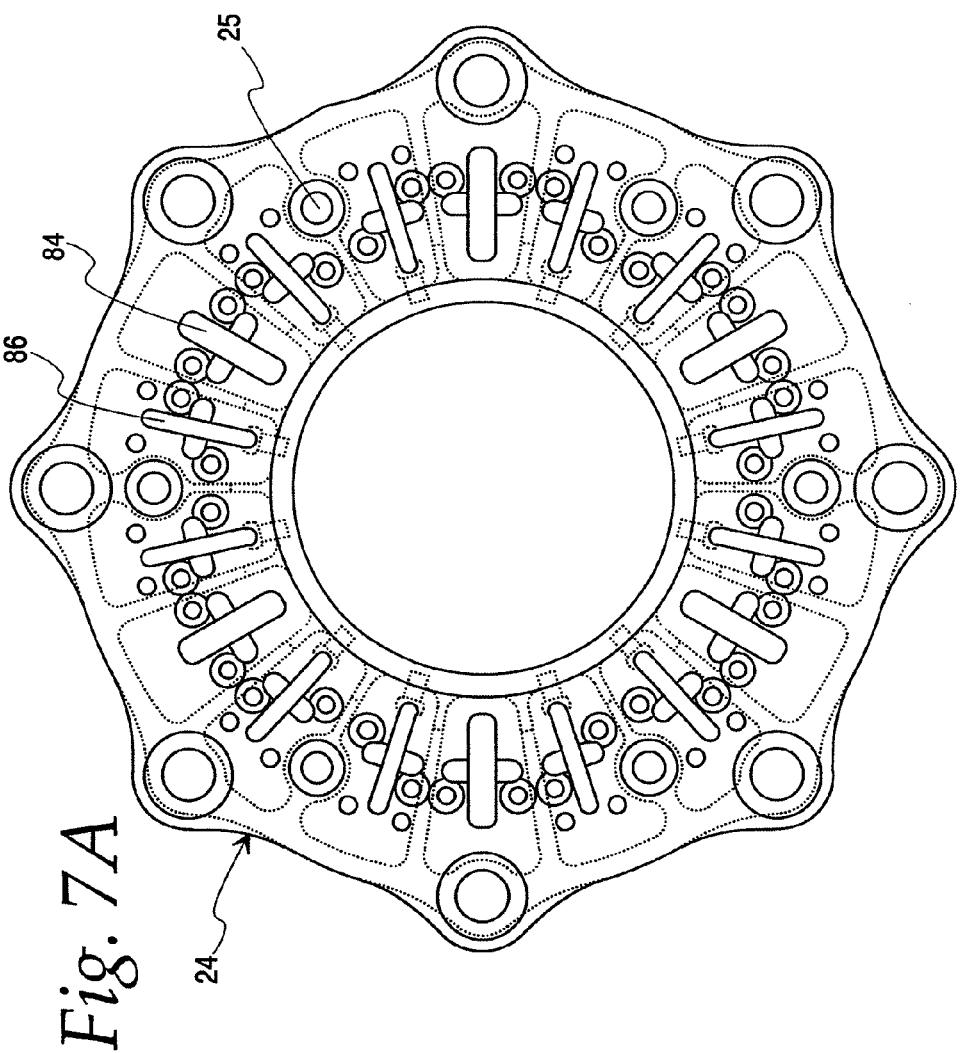

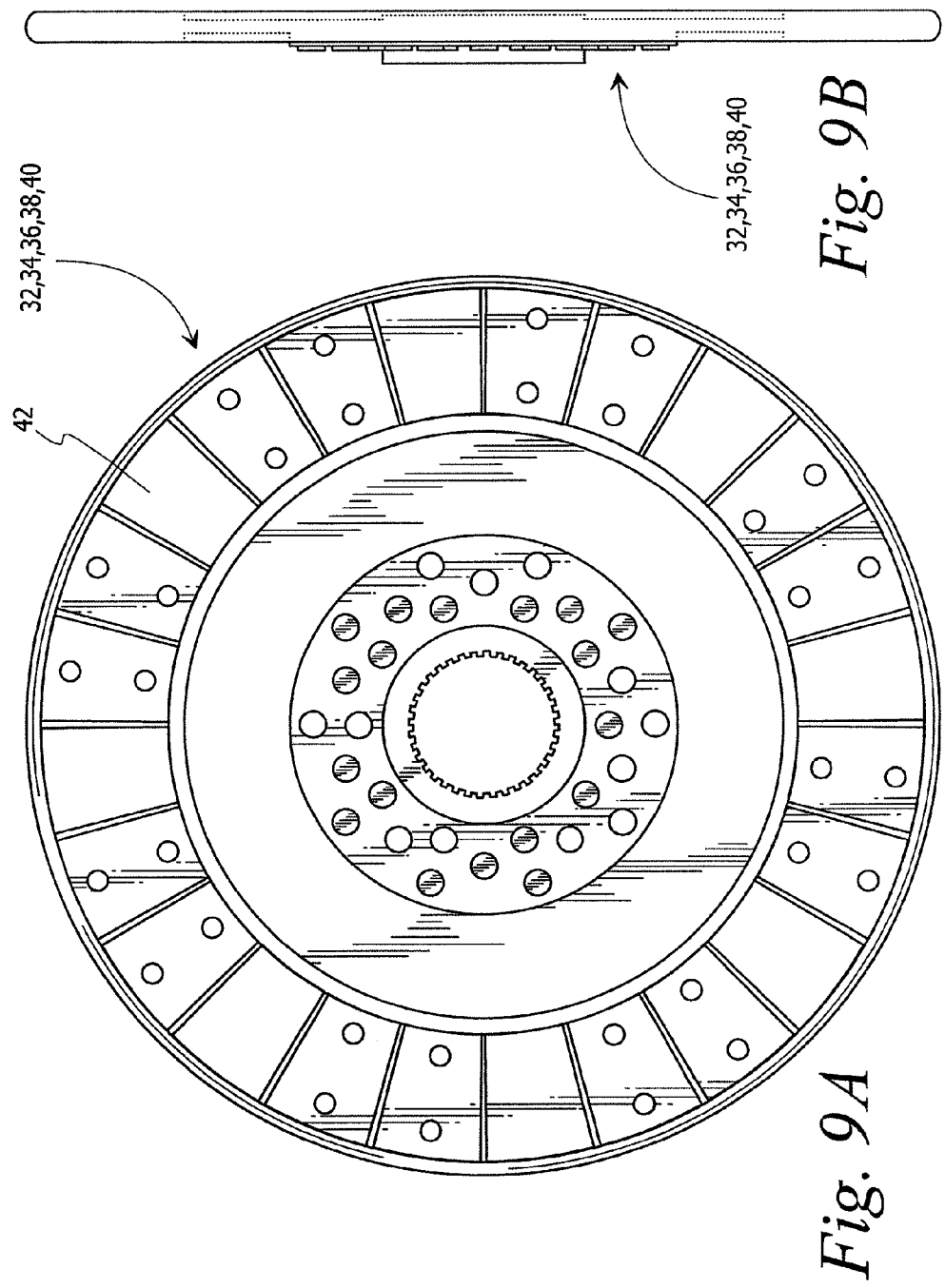

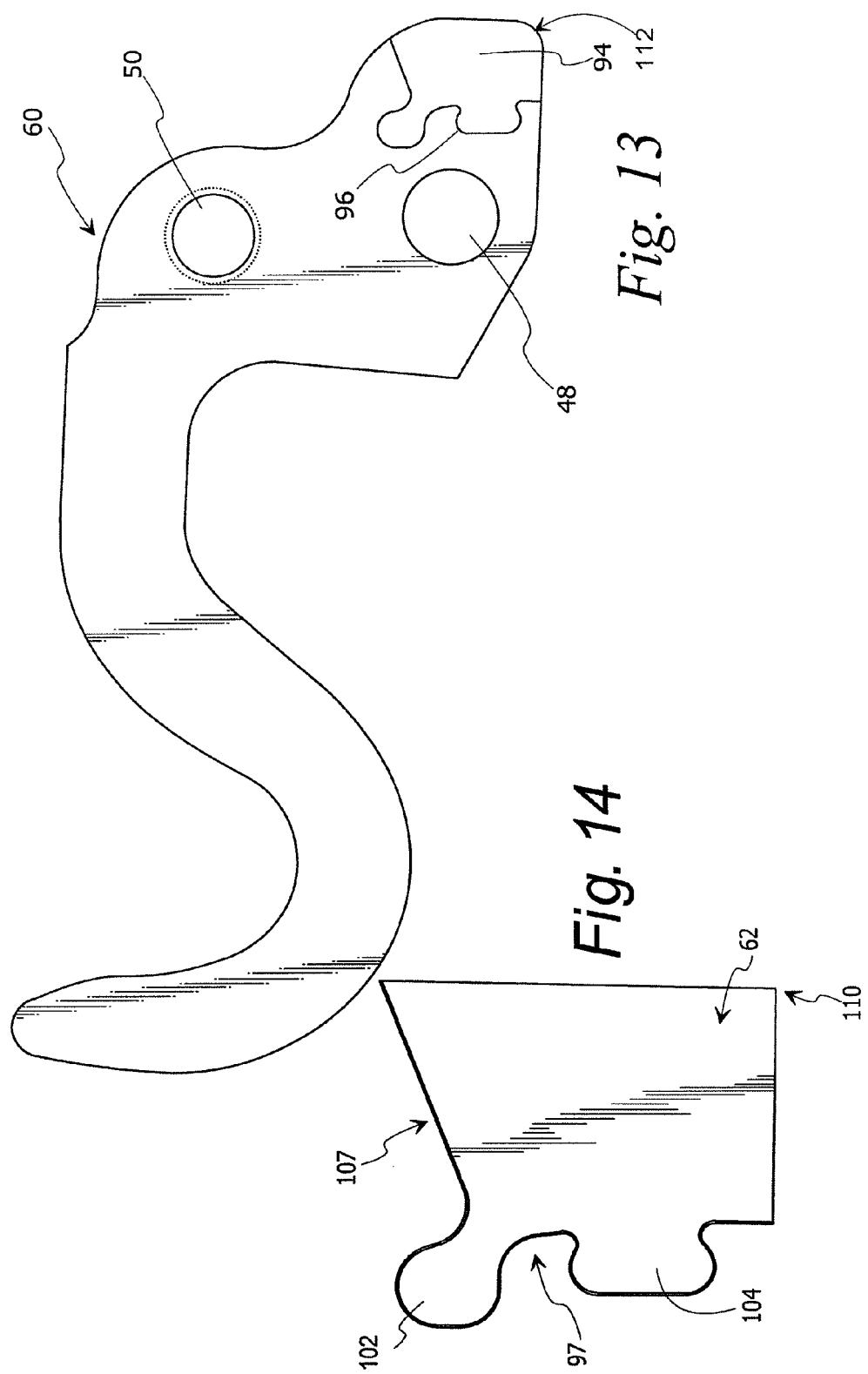

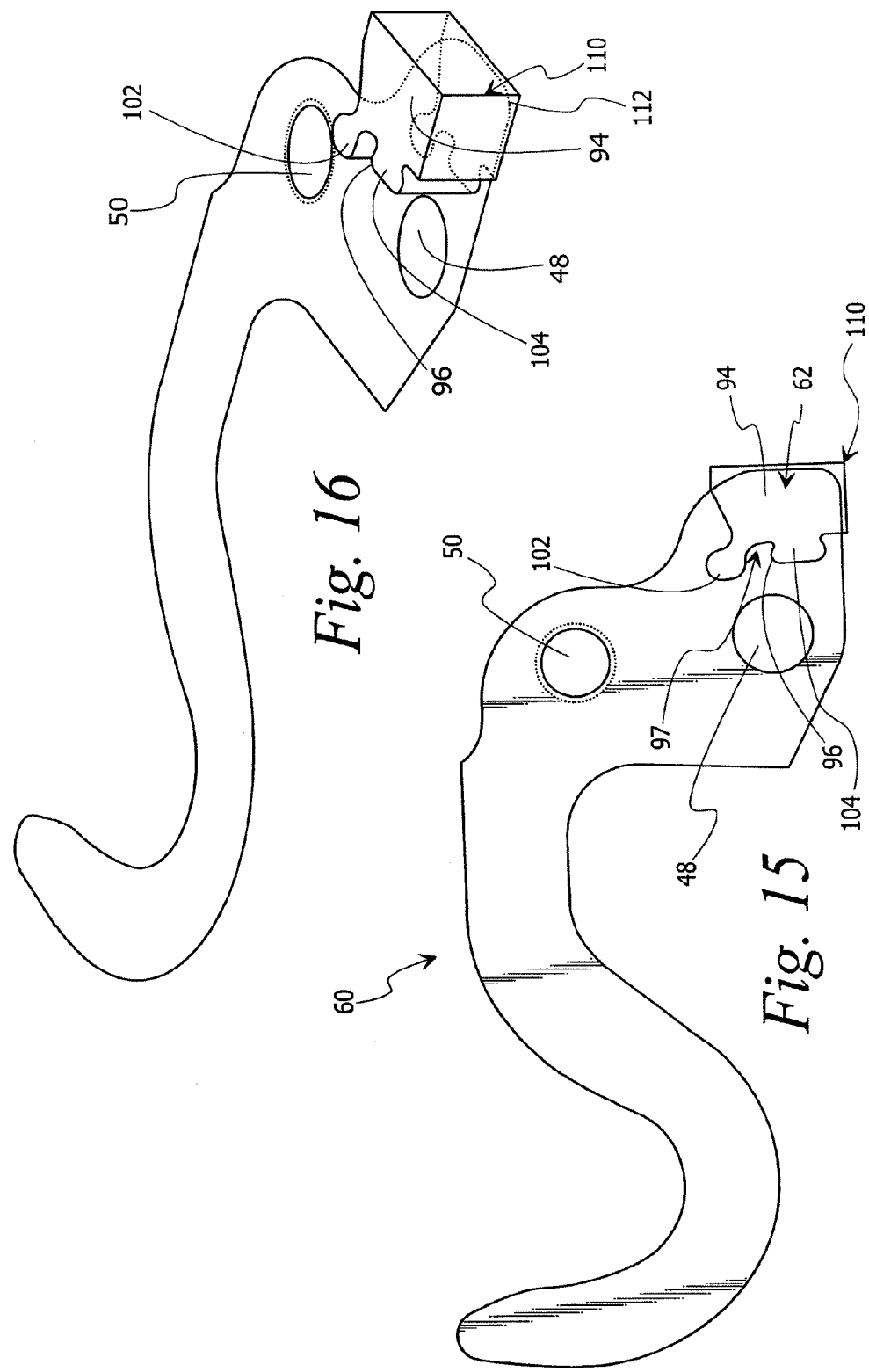

CLUTCH LEVER FOR RACING CAR

BACKGROUND OF THE INVENTION

1. Field of the Invention

The present invention relates to a centrifugal clutch and more particularly to a clutch lever for a centrifugal clutch used to apply axial pressure on one or more clutch disc assemblies as a function of the rotational speed of the engine; the clutch levers being formed with two pieces including a replaceable contact surface which obviates the need to replace the entire clutch lever when a clutch lever becomes damaged.

2. Description of the Prior Art

Clutch assemblies are used to couple the rotary power of the engine to the drive train of a vehicle. In automotive applications, the clutch is used to mechanically couple the flywheel, attached to the engine crank shaft, to the vehicle drive shaft by way of a clutch assembly. The flywheel enables torque from the engine to be transferred to the drive shaft. Known clutch assemblies are known to include a pressure plate and at least one clutch disk.

Various types of automotive clutch assemblies are known. In particular, both friction and centrifugal automotive clutch assemblies are known. Friction type clutch assemblies include a pressure plate and at least one clutch disc, disposed in a housing. An example of a friction type clutch assembly is described in detail in U.S. Pat. No. 7,082,661, hereby incorporated by reference. In general, in such friction type clutch assemblies, the pressure plate is mechanically coupled to the drive shaft and is mounted for axial movement from an engaged position to a non-engaged position. The clutch disc is splined so as to rotate with the drive shaft. In an engaged position, the pressure plate applies axial forces on the clutch disc against the flywheel to mechanically couple the clutch disc to the flywheel by friction in order to transmit the engine torque from the crank shaft to the drive shaft. In a disengaged position, the clutch disc does not contact the flywheel and therefore does not transmit the engine torque to the drive shaft. With such friction clutches, a manually operated clutch pedal inside the vehicle is used to engage and disengage the clutch.

Centrifugal clutches for automobiles are also known in the art. An example of a centrifugal clutch is disclosed in U.S. Pat. No. 4,485,905, hereby incorporated by reference. Such centrifugal clutches rely on centrifugal force to engage a clutch at high engine RPM and disengage the clutch at a relatively lower RPM. Such centrifugal clutches include a pressure plate and one or more clutch disc assemblies The pressure plate is attached to a vehicle flywheel, so as to rotate with the flywheel.

One or more clutch disc assemblies are splined to a common axis with respect to the drive shaft so that the drive shaft and the clutch disc rotate together. The clutch disc assemblies are configured for axial movement between the pressure plate and the flywheel. In an unengaged position, the clutch disc assemblies are spaced away from the flywheel. In such a position no rotational torque is transferred from the flywheel to the drive shaft. In an engaged position, the clutch disc assemblies make frictional contact with the flywheel causing the clutch disc assemblies and thus the drive shaft to rotate with the flywheel.

Such centrifugal clutch include a plurality of levers that are radially disposed and pivotably mounted with respect to the pressure plate. Weights are disposed on one or more of the clutch levers. In such centrifugal clutches, the pressure plate is directly mounted to the flywheel and thus rotates with the flywheel. Since the flywheel is directly connected to the engine crankshaft, the pressure plate rotates at the RPM (revolutions per minute) of the engine.

The clutch levers are used to apply a clamping force between the pressure plate and the flywheel to mechanically couple the clutch disc assemblies and thus the drive shaft to the flywheel. The clutch levers are pivotally connected to the pressure plate. Rotation of the pressure plate causes the clutch levers to pivot as a result of centrifugal force and exert a clamping force on the clutch disc assemblies. In particular, the levers are configured so that one end of the clutch levers exerts an axial force on the clutch disc assemblies in response to the centrifugal force to force the clutch disc assemblies to move axially toward the flywheel and make frictional contact with the flywheel. When a sufficient axial force is exerted on the clutch disc assemblies, the clutch disc assemblies make sufficient frictional contact with the flywheel to mechanically couple the clutch disc assemblies to the flywheel without slippage. Since the clutch disc assemblies are splined to the drive shaft, once the clutch disc assemblies are mechanically coupled to the flywheel, the rotating torque of the flywheel is transferred to the drive shaft. At low RPM, the clutch disc assemblies are spring biased in a direction away from the flywheel. Thus, at lower RPMs, the spring biasing force dominates and biases the clutch disc assemblies away from flywheel.

The clutch levers are known to undergo significant shear stress when the clutch levers are in the process of mechanically coupling the clutch disc assemblies to the flywheel. In time, the shear stress causes metal fatigue, resulting in one or more of the clutch levers breaking; normally somewhere between the point where the lever makes contact with the clutch disc and the pivot point of the lever. Due to the relatively high shear stress In racing applications, the levers may break after a few races. Such levers are precision parts and are thus relatively expensive. Any time a lever experiences a break, not only is the broken lever replaced but because of the metal fatigue problem discussed above, all levers are replaced. A typical lever for use in a racing application typically costs about $75-$110 for a lock-up lever and $170-$300 for a primary lever. In known applications, there can be eighteen (18) or more levers per clutch. This can cost, for example, about $2000-$3000 to replace all of the levers.

Thus, there is a need to come up with a better way to address the problem of replacement of the clutch levers used in conjunction with centrifugal clutches.

SUMMARY OF THE INVENTION

Briefly, the present invention relates to a clutch lever for a centrifugal clutch that is used to apply axial pressure on one or more clutch disc assemblies as a function of the rotational speed of the pressure plate. The clutch levers are configured to be pivotably mounted with respect to the pressure plate. In accordance with an important aspect of the invention, the clutch levers are formed with two pieces. One piece is formed as a replaceable nose piece or contact surface which obviates the need to replace the entire clutch lever when one becomes damaged. The other piece is complementary and is configured to be pivotably mounted with respect to the pressure plate, The two pieces are configured to be joined together to form a joint that is reinforced by the shear force exerted on the contact surface when the lever is applying axial forces against the clutch disc assemblies. As such, when the contact surface of the lever breaks, only one piece of the clutch lever needs to be replaced, lowering the cost as well as the labor required to replace the clutch lever.

DESCRIPTION OF THE DRAWING

These and other advantages of the present invention will be readily understood with reference to the following specification and attached drawing wherein:

FIG. 6A is a top plan view of an exemplary flywheel for use with the present invention.

FIG. 6B is an end view of the flywheel illustrated in FIG. 6A.

FIG. 7A is a top plan view of an exemplary pressure plate for use with the present invention.

FIG. 7B is an end view of the pressure plate illustrated in FIG. 7A.

FIG. 9A is a top plan view of an exemplary clutch disc for use with the present invention.

FIG. 9B is an end view of the clutch disc illustrated in FIG. 9A.

FIG. 13 is a plan view illustrating the clutch lever blank being stamped to create a clutch lever portion with a mating surface.

FIG. 14 is a plan view of a replaceable nose piece portion or contact surface portion with a complementary mating surface for mating with the mating surface of the clutch lever portion, which, when assembled to the clutch lever portion, forms a complete clutch lever.

FIG. 15 illustrates a further step in the production process illustrating the insert blank assembled to the clutch lever blank.

FIG. 16 is a plan view of the clutch lever portion, shown with the replaceable nose piece portion in isometric in order to illustrate the rounding off of the a corner of the replaceable nose piece portion.

DETAILED DESCRIPTION

The present invention relates to a clutch lever for a centrifugal clutch. The clutch lever in accordance with the present invention is used to apply axial pressure on one or more clutch disc assemblies as a function of the rotational speed of the engine. The clutch levers are configured to be pivotably mounted with respect to the pressure plate. As mentioned above, known clutch levers are known to break adjacent the contact surface due to shear stresses. In accordance with an important aspect of the invention, the clutch levers are formed in two pieces, which together form an entire clutch lever for use in a centrifugal clutch. One piece is formed as a replaceable nose piece or contact surface portion which obviates the need to replace the entire clutch lever when one becomes damaged. The other piece is a complementary lever portion and is configured to be pivotably mounted with respect to the pressure plate, The two pieces are configured to be joined together to form a joint that is reinforced by the shear force exerted on the contact surface when the clutch lever is applying axial forces against the clutch disc assemblies.

The clutch levers illustrated and disclosed may be used with vehicles used in various professional drag racing classes, such as "top fuel" and "funny car" drag racing classes. As defined by the National Hot Rod Association (NHRA), top fuel drag racing is a professional drag racing class by vehicles which run on a mix of about 90% nitromethane and 10% methanol. Funny car drag racing is another professional drag racing class in which the vehicles must meet relatively strict NHRA guidelines. The principles of the present invention are also applicable to all race car classes that use multiple disc centrifugal clutches with custom levers, such as, but not limited to, Top Alcohol Dragster, Top Alcohol Funny Car, Pro Mod, Pro Stock, Competition Eliminator, Nostalgia Top Fuel, and Nostalgia Funny Car. The principles of the present invention may also extend to helicopters, heavy equipment and military equipment and virtually centrifugal clutches in virtually any application that use clutch levers.

In order to fully comprehend the principles of the invention, it is necessary to understand in general how clutch levers are used in a centrifugal clutch. As such, attention is initially directed to FIGS. 1-10 which illustrate an exemplary centrifugal clutch assembly for use in various vehicles, such as vehicles used in drag racing.

Centrifugal Clutches in General

Figure 1:
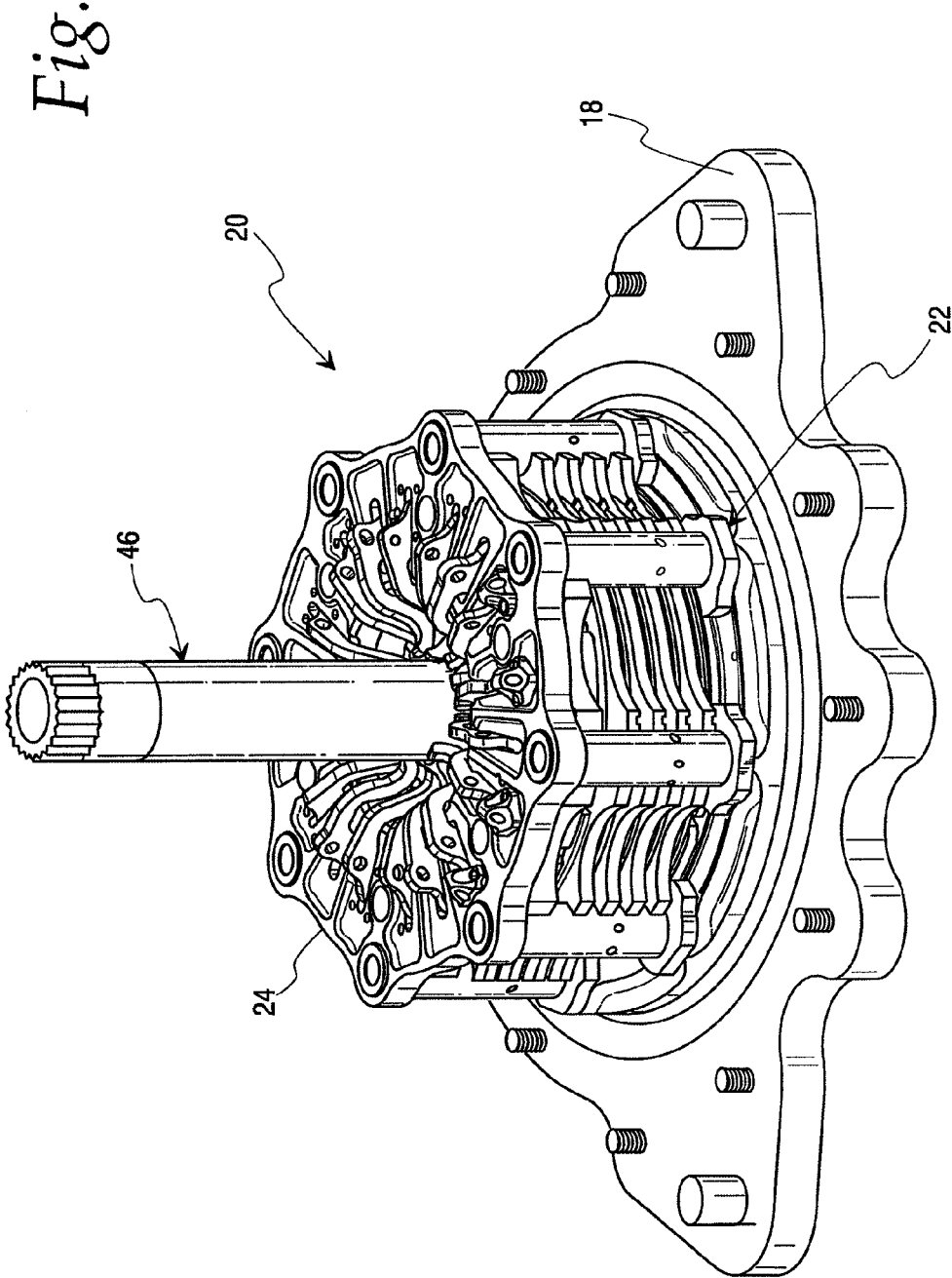
FIG. 1 is an isometric view of a centrifugal clutch assembly with an extending drive shaft shown assembled to a flywheel of a vehicle engine with the bell housing removed.

Referring first to FIG. 1, an exemplary centrifugal clutch assembly with an extending drive shaft is shown, assembled to a flywheel of a vehicle engine 18 with the bell housing removed. In particular, the exemplary centrifugal clutch assembly, generally, identified with the reference numeral 20, is shown assembled to a flywheel 22, that is connected to the engine crank shaft (not shown) so as to rotate therewith. An exemplary flywheel 22 is illustrated in FIGS. 6A and 6B. As will be discussed in more detail below, the clutch assembly 20 includes a pressure plate 24 that is rigidly secured to the flywheel 22. An exemplary pressure plate 24 is illustrated in FIGS. 7A and 7B.

Figure 2:
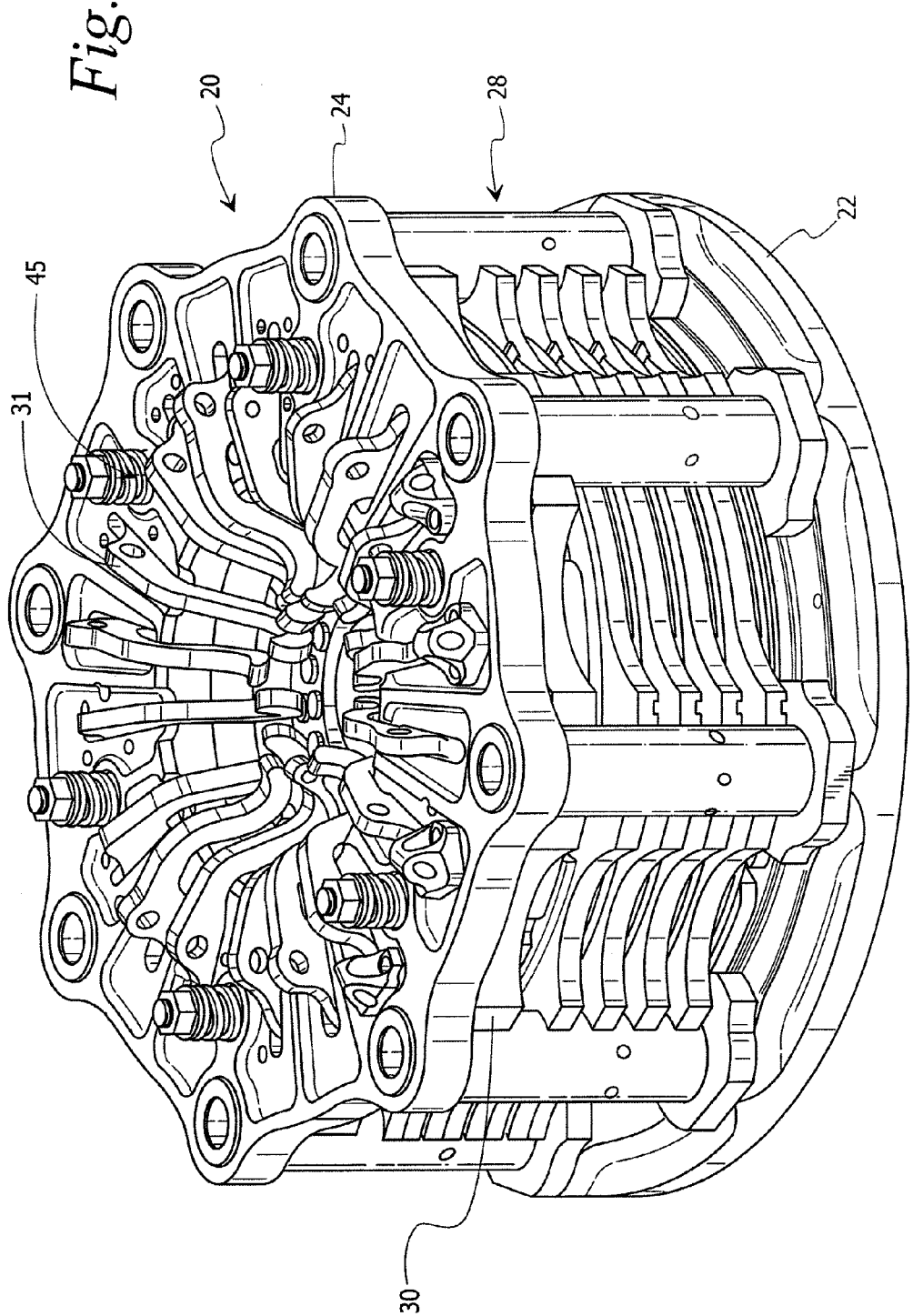
FIG. 2 is an isometric view of a centrifugal clutch assembly assembled to a flywheel.
Figure 10:
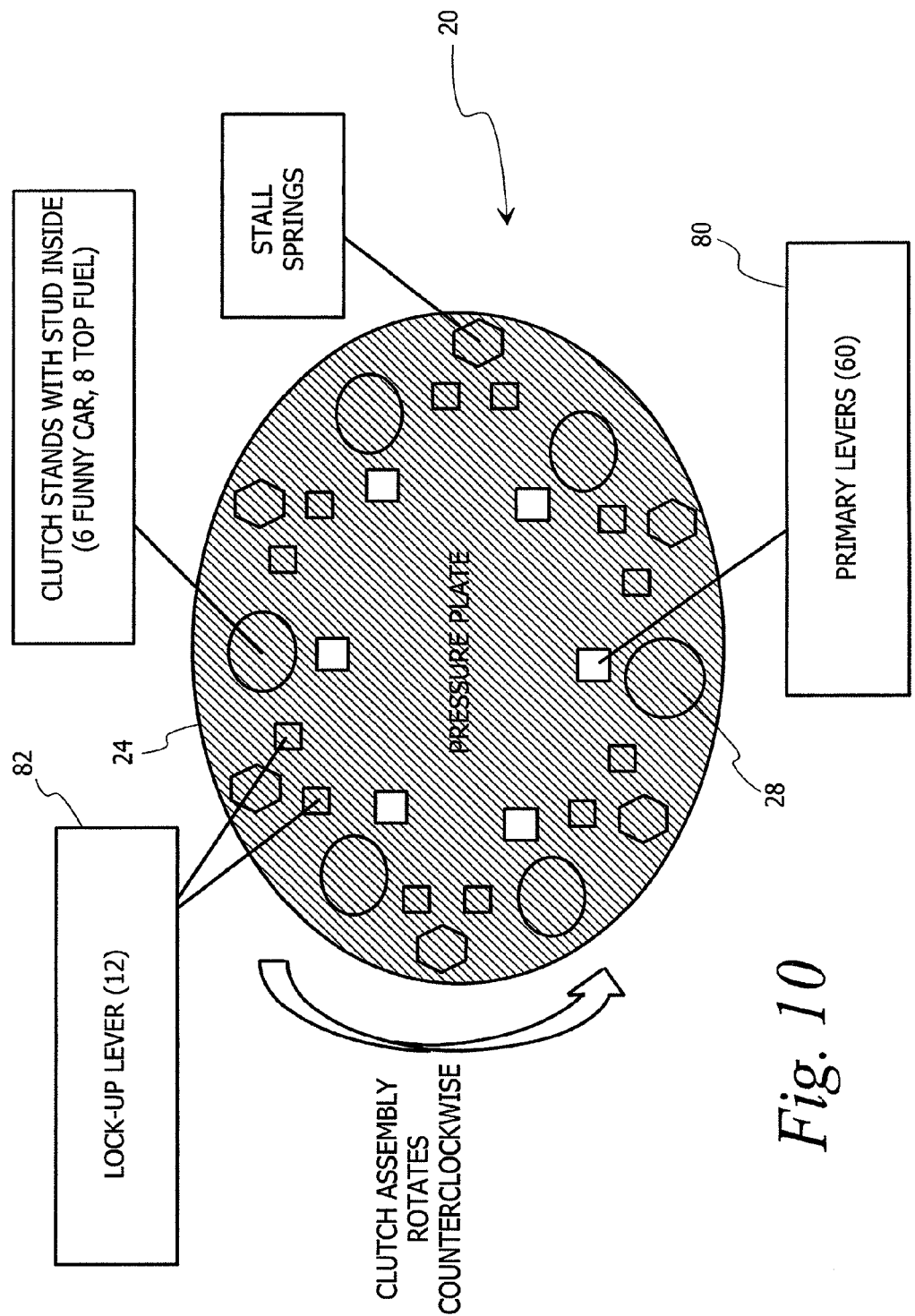
FIG. 10 is a simplified view illustrating exemplary applications of the clutch levers in accordance with the present invention

As best shown in FIG. 2, the pressure plate 24 is connected to the flywheel 22 by way of a plurality of standoffs or stands, generally identified with the reference numeral 28 and suitable fasteners (not shown). As illustrated in FIGS. 1 and 2, an exemplary eight (8) stands are shown while FIG. 10 illustrates an exemplary six (6) stands. As known in the art, clutch assemblies 20 used in funny car drag racing normally include six (6) stands while clutch assemblies 20 used in top fuel racing are known to includes eight (8) stands. That said, the number of stands is not critical to the practice of the invention.

Figure 3:
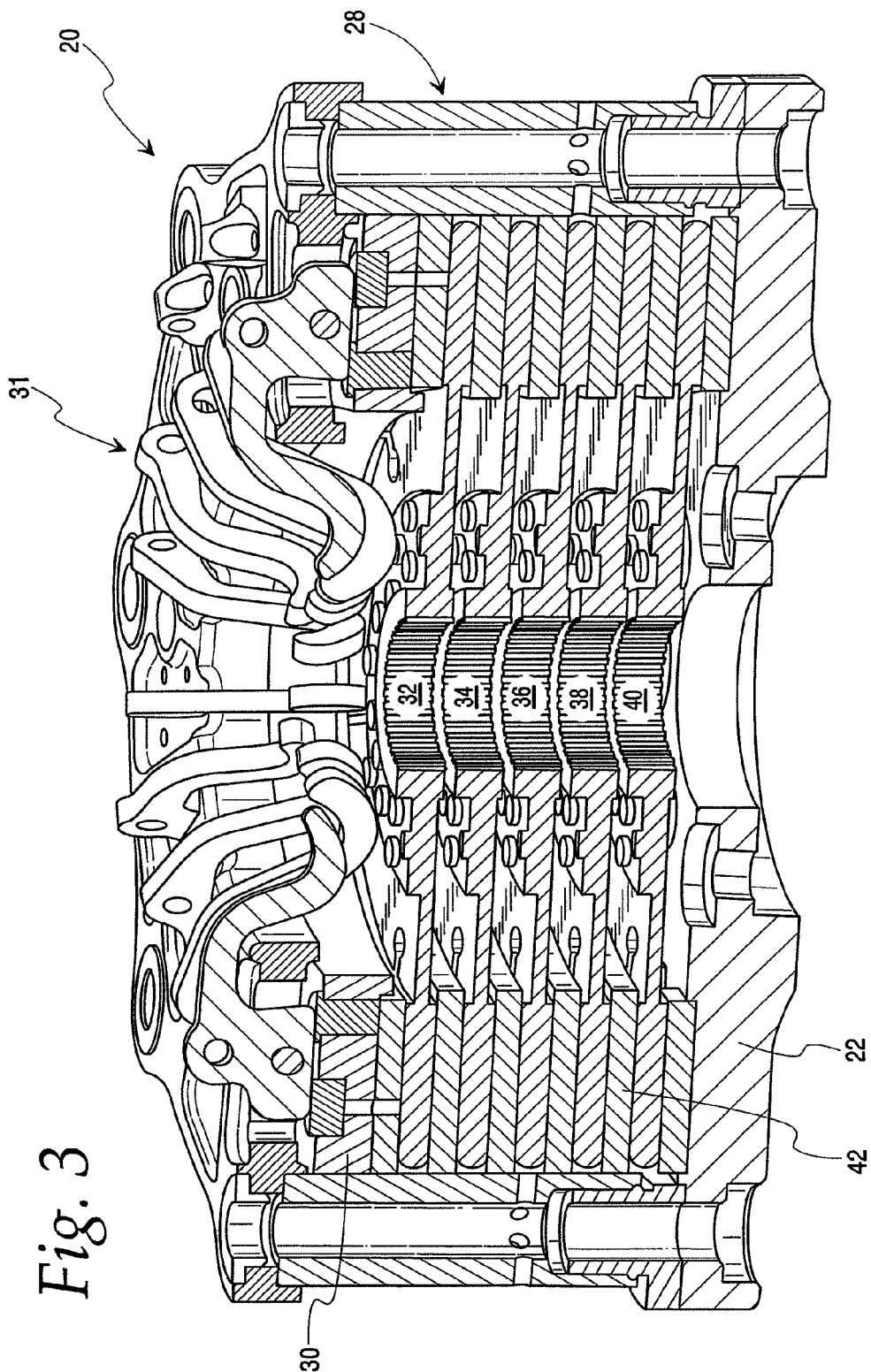
FIG. 3 is an elevational view in section of the centrifugal clutch assembly illustrated in FIG. 2 shown with the clutch levers in an engaged position.
Figure 5:
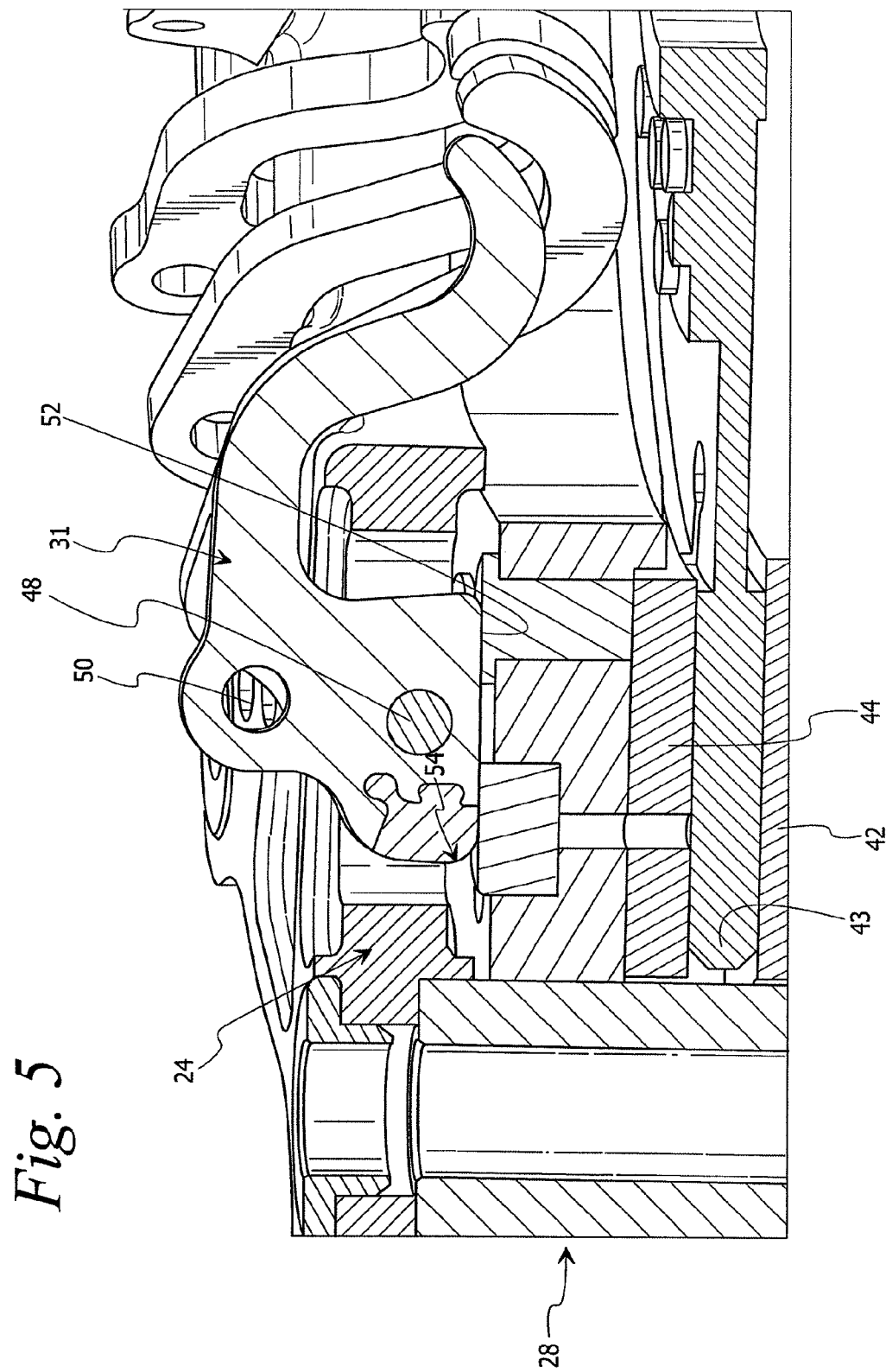
FIG. 5 is an enlarged partial sectional view of the centrifugal clutch illustrating several clutch levers in an engaged position.
Figure 8B:
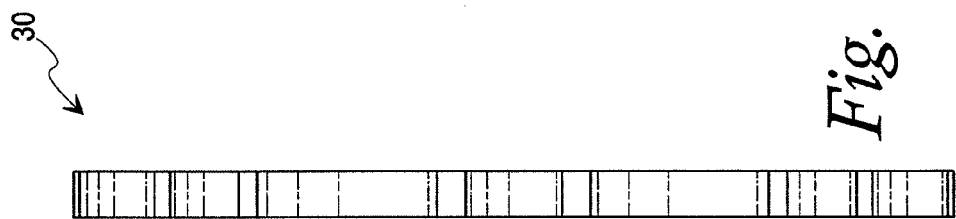
FIG. 8B is an end view of the spacer plate illustrated in FIG. 8A.
Figure 8A:
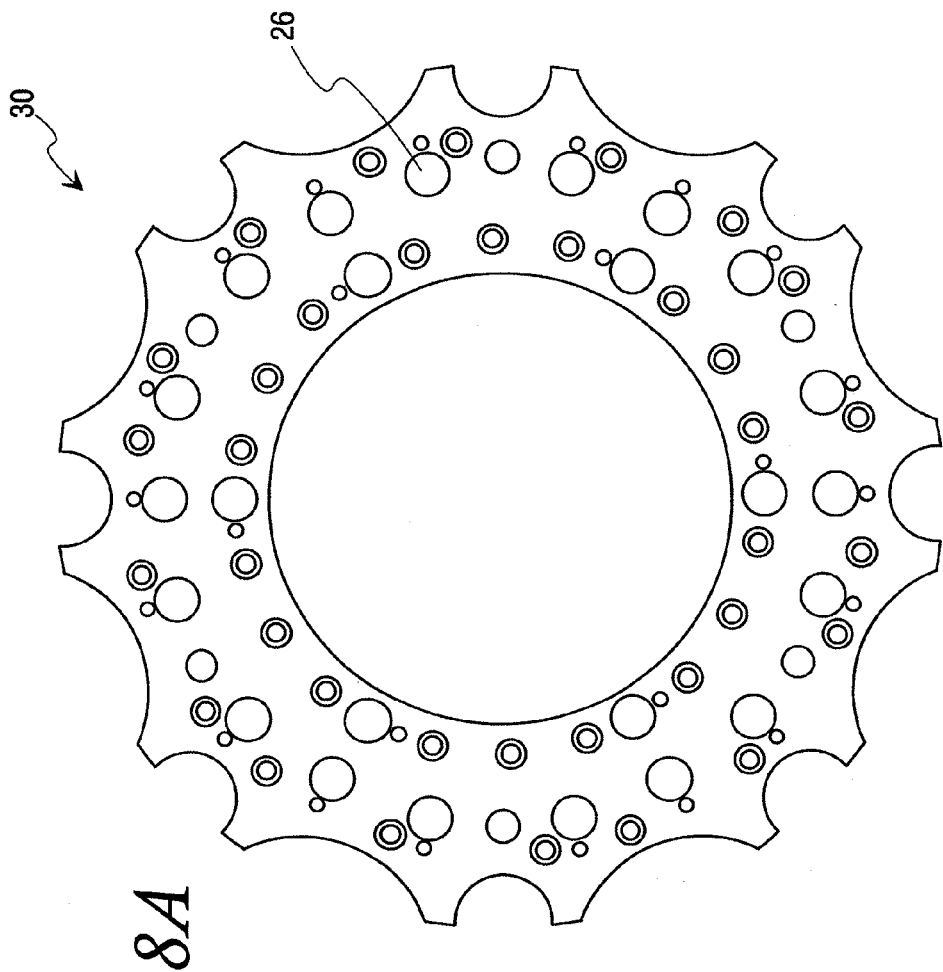
FIG. 8A is a top plan view of an exemplary spacer plate for use with the present invention.

A spacer plate 30 is mechanically coupled to the pressure plate 24. An exemplary spacer plate 30 or "donut" is illustrated In FIGS. 8A and 8B. The donut 30 is spring biased toward the pressure plate 24 when the clutch levers, generally identified with the reference numeral 31, are in a disengaged position as illustrated in FIG. 3. Between the donut 30 and the flywheel 22 are a number of clutch disc assemblies 32, 34, 36, 38 and 40 (FIG. 3). An exemplary clutch disc assembly is illustrated in FIGS. 9A and 9B. These clutch disc assemblies 32, 34, 36, 38 and 40 all include friction material, generally identified with the reference numeral 42 (FIG. 9A). The frictional material is shown formed as a ring and riveted to a clutch plate 43 (FIG. 5) to form a clutch disc assembly 32, 34, 36, 38 and 40. The friction material 42 may be made from the same material as brake pads. As shown in FIG. 5, the friction material 42 on the clutch disc assembly 32 (FIG. 3) is adapted to contact the friction material 44 (FIG. 5), located on the underside of the donut 30.

Figure 4:
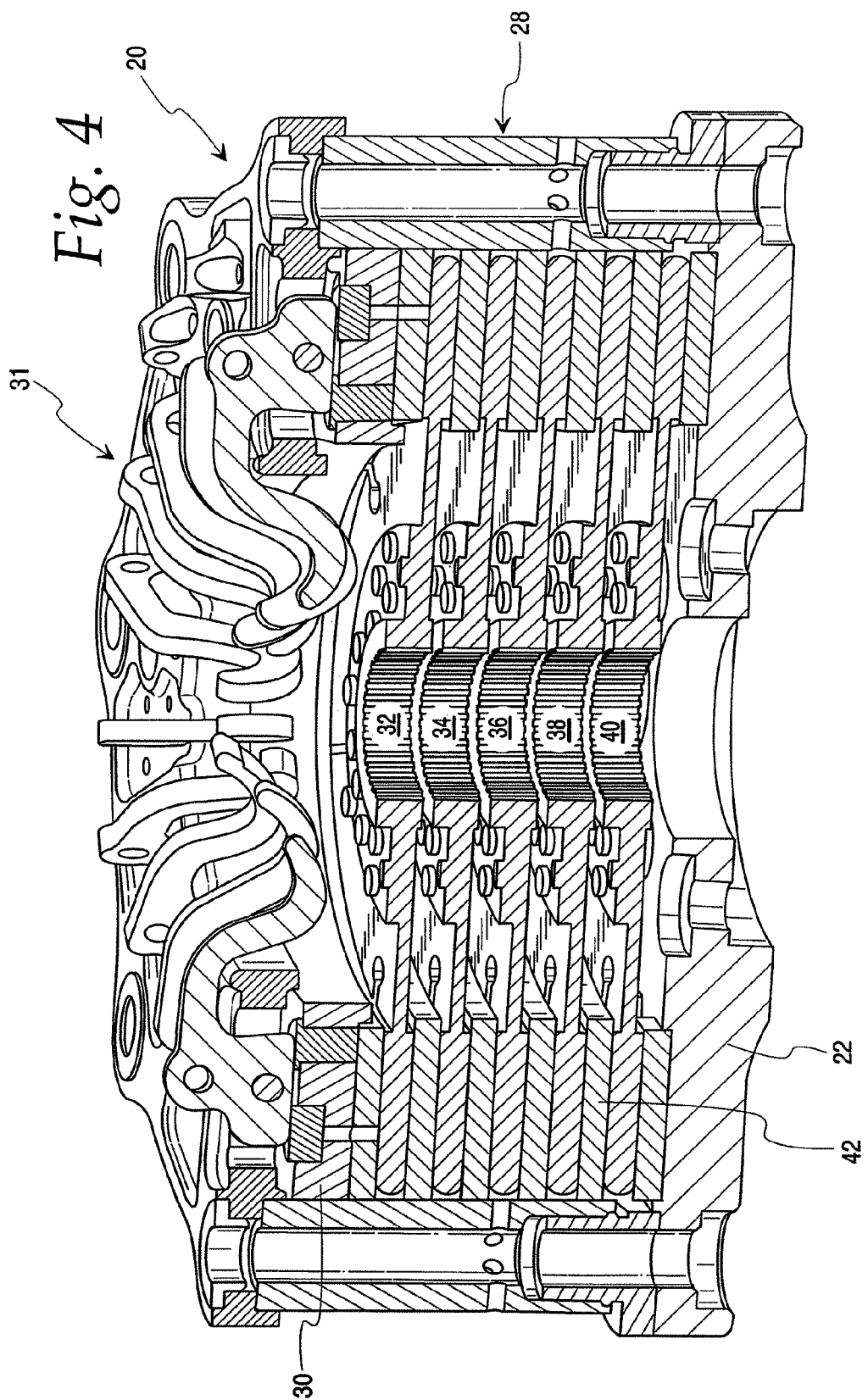
FIG. 4 is similar to FIG. 3 but shown with the clutch levers in a disengaged position.

When the clutch levers 31 are unengaged, as illustrated in FIG. 3. the clutch disc assemblies 32, 34, 36, 38 and 40 slip and are not mechanically coupled to the flywheel 22. In an engaged position, as illustrated in FIG. 4, the clutch levers 31 exert an axial force on the donut 30 which overcomes the compression force exerted by the biasing spring assemblies 45 (FIG. 2) used to couple the donut 30 to the pressure plate 24. As is known in the art, such biasing assemblies exert a compression force on the donut 30 with respect to the pressure plate 24 to bias the donut 30 toward the pressure plate 24.

When the axial force of the clutch levers 31 overcomes the compression force of the biasing spring assemblies 45, the donut 30 is moved axially away from the pressure plate 24 and towards the flywheel 22, thus exerting a clamping force on the clutch disc assemblies 32, 34, 36, 38 and 40, thus compressing the clutch disc assemblies 32, 34, 36, 38 and 40 against the flywheel 22. This action mechanically couples the clutch disc assemblies 32, 34, 36, 38 and 40 to the flywheel 22, thereby causing the clutch disc assemblies 32, 34, 36, 38 and 40 to rotate with the flywheel 22 without slipping. As mentioned above, the vehicle drive shaft, generally identified with the reference numeral 46 (FIG. 1) is splined to the clutch disc assemblies 32, 34, 36, 38 and 40. Thus, when the clutch disc assemblies 32, 34, 36, 38 and 40 are mechanically coupled to the flywheel 22, the engine torque is transferred to the drive shaft 46.

As best shown in FIG. 5, the clutch levers 31 are pivotally connected to the pressure plate 24 by way of a pivot point 48. Each of the clutch levers 31 may include an additional aperture 50. The aperture 50 may be used to attach a weight (not shown). The weight may consist of a bolt and a nut and may include washers (not shown). A flat surface of the clutch lever 31, generally identified with the reference numeral 52, is configured to contact the donut 30.

As mentioned above, the pressure plate 24 is rigidly connected to the flywheel 22 and thus rotates therewith. Since the clutch levers 31 are pivotally connected to the pressure plate 24, counter-clockwise rotation of the flywheel 22 results in an outward radial force on the clutch levers 31, known as a centrifugal force, causing the clutch levers 31 to rotate in a counter clockwise direction. The system is configured so that the counter clockwise rotation of the clutch levers 31 overcomes the opposing biasing force of the spring assemblies 45 (FIG. 2) and places a compression force on the clutch disc assemblies 32, 34, 36, 38 and 40 to mechanically couple the clutch disc assemblies 32, 34, 36, 38 and 40 to the flywheel 22.

Figure 11A:
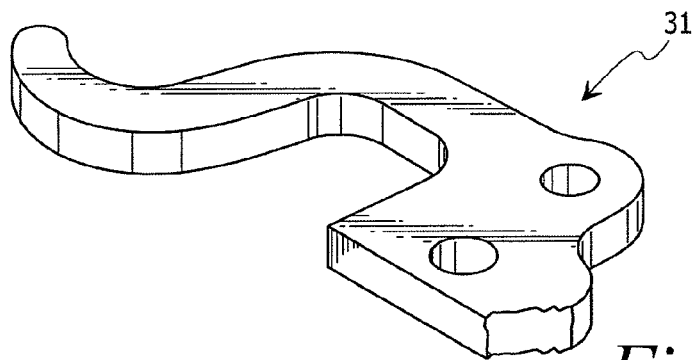
FIG. 11A is an isometric view of a known clutch lever with a contact surface broken off.

More particularly, under normal conditions, the counter clockwise rotation of the clutch levers 31 causes an axial force (i.e. axial with respect to the axis of the drive shaft 46) on the donut 30. As mentioned above, this axial force along with the axial forces of the other clutch levers 31 pivotally mounted to the pressure plate 24, results in an aggregated compression force which compresses the donut 30 and all of the clutch disc assemblies 32, 34, 36, 38 and 40 against the flywheel 22. This action places a considerable amount of stress on a nose portion 54 (FIG. 5) of the clutch lever 31, often causing the nose portion 54 to break off, as shown in FIG. 11A.

Two-Piece Clutch Lever

Figure 11B:
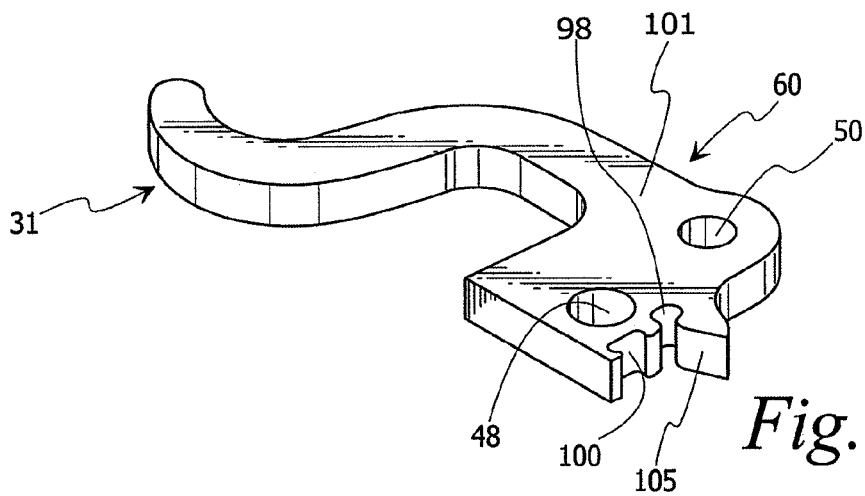
FIG. 11B is an isometric drawing of the two piece clutch lever in accordance with the present invention, shown with a replaceable nose piece or contact surface removed.
Figure 11C:
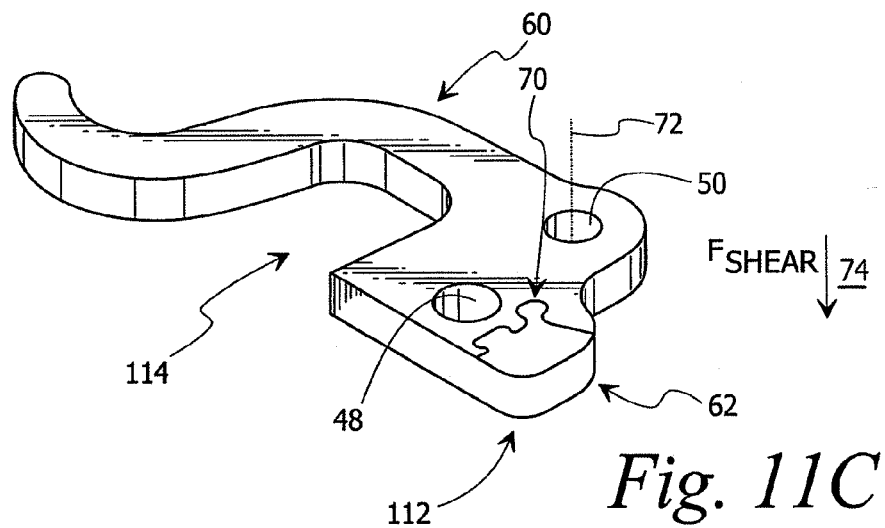
FIG. 11C is similar to FIG. 11B but shown with the two piece clutch lever fully assembled.

Referring to FIGS. 11B and 11C, a clutch lever 31 in accordance with the present invention is illustrated. The clutch lever 31 is formed in two pieces; a lever portion 60 and a replaceable nose piece or contact surface 62. The lever portion 60 includes an aperture 48 which defines a pivot axis which allows the clutch lever 31 to be pivotably connected to the pressure plate 22 as discussed above. The lever portion 60 also includes an aperture 50 for adding weight to the lever 31, as discussed above.

The lever portion 60 and the replaceable nose piece portion 62 (collectively, "mating pieces 60 and 62") are formed with complementary mating surfaces to enable the mating pieces 60 and 62 to be joined together and form a joint 70 (FIG. 11C). As will be discussed in more detail below, the joint 70 is formed so that the mating pieces 60 and 62 can only be joined in one direction. More specifically, the mating pieces 60 and 62 can only be joined in a direction parallel to the plane of the mating pieces 60 and 62, as indicated by the axis 72, and parallel to the direction of the shear force $F_{SHEAR}$, as indicated by the arrow 74. Moreover, the mating pieces 60 and 62 are tapered so that the mating pieces 60 and 62 can only be joined from one side of the clutch lever 31. In particular, the direction of insertion is the same direction as the shear force $F_{SHEAR}$. With such a configuration, the mating pieces 60 and 62 are configured so that the shear force $F_{SHEAR}$ enforces the joining of the mating pieces 60 and 62.

Referring to FIG. 10, an simplified diagram illustrating exemplary applications is illustrated. In particular, the centrifugal clutch 20 is shown configured for racing applications which include primary levers 80 and lock-up levers 82. As mentioned above, these clutch levers 80 and 82 are used to apply a clamping force between the pressure plate 24, the flywheel 22 and the various clutch disc assemblies 32-40 therebetween. The clamping force results in the frictional surfaces 42 (FIG. 5) on the various clutch disc assemblies 32-40 and the frictional surface 44 on the spacer plate 30 contacting each other in order to create an aggregate frictional force that opposes the rotational torque of the flywheel 22 to clamp the clutch disc assemblies 32-40 against the flywheel 22 so that the clutch disc assemblies 32-40 transfer the rotational torque of the flywheel 22 to the drive shaft 46 (FIG. 1).

An exemplary application of the clutch assembly 20 is shown in FIG. 10 with six (6) primary levers 80 and twelve (12) lock up levers 82. The primary levers 80 and the lock up levers 82 may be formed with different thicknesses. Alternatively, the levers 80 and 82 may be formed with the same thickness. As shown in FIG. 7, the pressure plate 24 is shown with relatively wide slots 84 and relatively thinner slots 86. The wide slots 84 are for receiving the primary levers 80 while the thinner slots 86 are for receiving the lock-up levers 82. In embodiments in which all of the levers are formed with the same thickness, the slots 84 and 86 would also be formed with the same thickness.

As shown in FIG. 10, the pressure plate 24 rotates in a counter-clockwise direction. The counter clockwise rotation of the pressure plate 24 causes the primary levers 80 and the lock up levers 82 to pivot with respect to the pressure plate 24 in order to create a clamping force to mechanically couple the clutch disc assemblies 32-40 to the flywheel 22. This clamping force is provided by centrifugal force. As known in the art, centrifugal force is an outward radial force that is directly proportional to the rotational speed of an object and its mass. Thus, rotation of the pressure plate 24 exerts a centrifugal force on the clutch levers 80 and 82, which causes them to rotate with respect to the pressure plate 24 and exert a downward clamping force on the spacer plate 30 and the clutch disc assemblies 32-40 to mechanically couple the clutch disc assemblies 32-40 to the flywheel 22. Since the centrifugal force is directly proportional to the rotational speed of the clutch levers 80 and 82, the faster the pressure plate 24 rotates, the more centrifugal force and thus more clamping force is generated. Moreover, since the centrifugal force is also directly proportional to the mass of the clutch levers 80 and 82, additional mass will also increase the centrifugal force and thus the clamping force of the levers 80 and 82. The mass of the levers 80 and 82 can be increased by physically increasing the mass of the levers 80 and 82 or adding weights to the levers or a combination of both.

As mentioned above, the clutch levers 80 and 82 pivot with respect to the pressure plate 24 as a function of the rotational speed of the pressure plate 24. Since the pressure plate 24 is mechanically coupled to the flywheel 22, the clutch levers 80 and 82 pivot as a function of the rotational speed of the flywheel 22. Thus, the faster the engine RPM, the more clamping force is generated. In an exemplary embodiment with a configuration as illustrated in FIG. 10, the primary levers 80 are configured to actuate before the lock up levers 82. In particular, the primary levers 80 are formed with more mass than the lock up levers 82. Since both the primary levers 80 and the lock up levers will be rotated at the same speed, the primary levers 80 having more mass will actuate before the lock up levers 82 since centrifugal force is a function of the mass of the object and the speed of rotation. As the engine RPM increases, the centrifugal force exerted on the lock up levers 82 causes the lock up levers 82 to pivot with respect to the pressure plate 24 and exert a clamping force toward the flywheel 22. The collective clamping forces from the primary levers 80 and the lock up levers 82 creates a sufficient clamping force to mechanically couple the clutch disc assemblies 32-40 to the flywheel 22 to transfer the mechanical torque from the flywheel 22 to the drive shaft 46 (FIG. 1)

Method for Making Two Piece Clutch Lever

Figure 12:
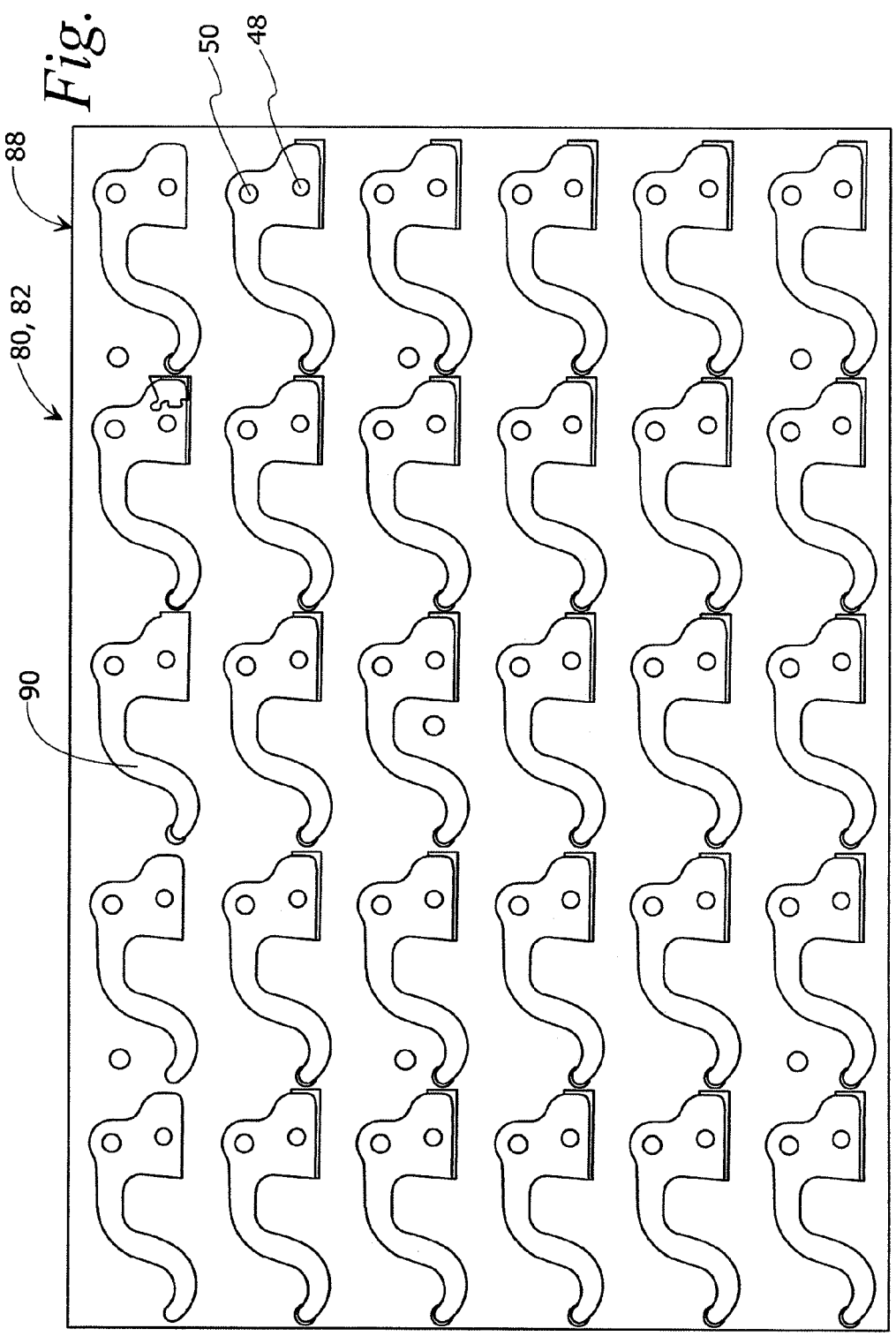
FIG. 12 is a plan view of a plate stamped with clutch lever blanks in accordance with the present invention.

FIGS. 12-16 illustrate an exemplary method for making the two-piece clutch lever 31. in accordance with the present invention as described above and illustrated in FIGS. 11B-11D. Referring to FIG. 12, a plurality of primary levers 80 or lock up levers 82 may be die cut from a plate, for example, a 12"×18" plate 88. Using a 12"×18" plate, twenty four (24) clutch lever blanks, generally identified with the reference numeral 90, may be formed. The stock material for both the primary levers 80 and the lock up levers 82 is selected to a sufficient hardness, for example S7-Tool Steel and heat treated and ground to a hardness of 58-60 Rockwell or better. As mentioned above, the primary levers 80 are formed to have relatively more mass than the lock up levers 82. Thus, the plate 88 for the primary levers may be selected to have a thickness of 0.375 inches while the thickness of the plate 88 for the lock up levers may be selected to have a thickness of 0.265 inches.

The clutch lever blanks 90 are stamped with two (2) through holes 48 and 50. As illustrated in FIG. 5, the through hole 48 defines the pivot axis about which the clutch lever 31 pivots with respect to the pressure plate 24. The through hole 50 may be threaded and used to add weights, such as a threaded fastener and/or nut (not shown). As shown, the radial distance of the through hole 50 relative to the pivot axis of the clutch lever 31 as defined by the through hole 48 is slightly offset relative to the through hole 48 since the centrifugal force is inversely proportional to radial distance of any added mass, such as a threaded fastener, relative to the pivot axis.

FIG. 13 illustrates the clutch lever blank 90 being stamped to create a lever portion 60 with a mating surface 96. After the individual clutch lever blanks 90 are stamped out, an irregular shaped piece, for example the piece 94 is die cut from the clutch blank 90, which forms a mating surface 96, for example, as shown in FIG. 11B.

In accordance with an important aspect of the invention, the mating surface 96 is tapered relative to the thickness of the clutch blank 90 so that the corresponding mating surface of the replaceable nose piece portion 62 can only be inserted in a direction generally perpendicular to the plane of the clutch blank 90 and only in a direction of the shear force $F_{SHEAR}$, as discussed above. Thus, the mating surface of the clutch blank 90 is formed with an irregular profile. For example, the clutch blank 90 is formed with two irregular shaped slots 98 and 100, as shown. The width of one or both of these slots 98 and 100 is varied, for example, from side to side and gradually tapered across the thickness of the clutch blank 90 from one side to the other, for example from one side to an opposing side 101 (FIG. 11B). In particular, the slots 98 and 100 are formed to be slightly wider on one side than the opposing side. In addition, the slots 98, 100 on the opposing side 101 are formed so as stop travel of the replaceable nose piece 62 portion and to allow the replaceable nose piece 62 to be press fit and snapped into place.

Turning to FIG. 14, the replaceable nose piece portion 62 may be die cut from tool steel, for example, type CPM-15V tool steel, and heat treated and ground to a hardness of 58-60 Rockwell or better, for example. The replaceable nose piece portion 62 is formed with a complementary mating surface 97 to the mating surface 96 on the clutch blanks 90. The thickness of the nose piece 62 may be selected to have the same thickness as the thickness of the corresponding clutch blank 90. In order to mate with the clutch lever portion 60, the replaceable nose piece portion 62 is formed with mating projections 102 and 104 (FIG. 14) that are configured to mate and interlock with the slots 98 and 100 formed in the clutch blanks 90.

More particularly, the shapes of the slots 98 and 100 (FIG. 13) on the clutch lever portion 60 and the projections 102 and 104 (FIG. 14) on the replaceable nose piece portions 62 are selected to prevent any radial movement of the nose piece 62 relative to the clutch blank 90. For example, with reference to FIG. 11B, The clutch blank 90 is formed with a sloped surface 105. This sloped surface 105 (FIG. 11B) on the clutch lever portion 60 is configured to engage a sloped surface 107 (FIG. 14) on the replaceable nose piece portion 62. Also the projections 102 and 104 (FIG. 14) on the replaceable nose piece portion 62 are configured to interlock with the slots 98 and 100 (FIG. 11B) on the clutch lever portion 62. As such, when the replaceable nose piece portion 62 is assembled to the clutch lever portion 60, the configuration mentioned above prevents radial movement of the replaceable nose piece portion 62 relative to the clutch lever blank 90.

As shown in FIG. 15, the replaceable nose piece portion 62 is initially formed with a squared heal 110. The squared heal 110 may be cut or ground down to form a rounded surface 112, as generally shown in FIG. 11C. The rounded surface 112, shown in phantom in FIG. 16. The rounded surface allows the clutch lever assembly to roll on the surface of the spacer plate 30 when the clutch lever 31 to roll along the surface of the donut 30 to minimize radial stress.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

I claim:

1. A clutch lever for applying an axial clamping force to a clutch assembly portion of a centrifugal clutch as a function of a centrifugal force applied to the clutch lever, the clutch lever comprising:
   a lever portion, said lever portion having (i) a first aperture adapted to enable said lever portion to be pivotally mounted with respect a pressure plate that forms a portion of said clutch assembly, and (ii) a first mating surface,
      wherein the lever portion is configured to pivot about a pivot axis; and
   a replaceable nose piece portion, said replaceable nose piece portion having a second mating surface,
      wherein said second mating surface is (i) complementary to said first mating surface, and (ii) configured to form a joint with said first mating surface that enables said replaceable nose piece portion to slideably engage said lever portion in a direction substantially parallel to the pivot axis,
      wherein said lever portion and said replaceable nose piece portion slideably engage to form a single clutch lever for use in a said clutch assembly.

2. The clutch lever as recited in claim 1, wherein the clutch lever is configured to exert an axial force on a spacer plate via said replaceable nose piece portion, which in turn exerts an axial force on a clutch disc, thereby developing a shear force $F_{SHEAR}$.

3. The clutch lever as recited in claim 2, wherein the joint between said first and second mating surfaces is reinforced by said shear forces $F_{SHEAR}$.

4. The clutch lever as recited in claim 1, wherein said lever portion is configured to receive a weight.

5. The clutch lever as recited in claim 4, further including a second aperture in said lever portion for receiving a weight.

6. The clutch lever as recited in claim 1, wherein said lever portion and said replaceable nose portion are configured to form a primary lever.

7. The clutch lever as recited in claim 1, wherein said lever portion and said replaceable nose portion are configured to form a lock-up lever.

8. The clutch lever as recited in claim 1, wherein said lever portion and said replaceable nose portion are formed from heat treated steel having a hardness of at least 58-60 Rockwell.

9. The clutch lever as recited in claim 1, wherein said lever portion is fabricated from heat treated S-7 tool steel having a hardness of at least 58-60 Rockwell.

10. The clutch lever as recited in claim 1, wherein said replaceable nose portion is fabricated from heat treated CPM-15V tool steel having a hardness of at least 58-60 Rockwell.

11. The clutch lever as recited in claim 1, wherein said first and second mating surfaces are tapered such that the replaceable nose piece portion may only slideably engage said lever portion from a single direction.

12. The clutch lever as recited in claim 1, wherein said first and second mating surfaces are formed with an irregular profile.

13. A clutch assembly for use in a centrifugal clutch, the clutch assembly comprising:
   a pressure plate, the pressure plate being configured to rigidly coupled with a flywheel of a vehicle engine;
   spacer plate operatively coupled to the pressure plate, wherein the spacer plate is spring biased toward the pressure plate;
   a plurality of clutch discs, wherein one of said plurality of clutch discs is configured to selectively engage the spacer plate; and
   a plurality of clutch levers pivotally connected to the pressure plate by way of a pivot point, each of said plurality of clutch levers having
      (1) a lever portion, said lever portion having (i) a first aperture adapted to enable said lever portion to be pivotally mounted with respect the pressure plate, and (ii) a first mating surface,
         wherein the lever portion is configured to pivot about a pivot axis, and
      (2) a replaceable nose piece portion, said replaceable nose piece portion having a second mating surface,
         wherein said second mating surface is (i) complementary to said first mating surface, and (ii) configured to form a joint with said first mating surface that enables said replaceable nose piece portion to slideably engage said lever portion in a direction substantially parallel to the pivot axis.

14. The clutch assembly as recited in claim 13, wherein each of said plurality of clutch levers is configured to exert an axial force on the spacer plate, which in turn exerts an axial force on said plurality of clutch discs, thereby developing a shear force $F_{SHEAR}$, which reinforces the joint between each of said first and second mating surfaces.

15. The clutch assembly as recited in claim 13, wherein said first and second mating surfaces of each of said plurality of clutch levers are formed with an irregular profile.

16. The clutch assembly as recited in claim 13, wherein at least one of said plurality of clutch levers is configured to receive a weight.

17. The clutch assembly as recited in claim 13, wherein said lever portion and said replaceable nose portion of each of said plurality of clutch levers are formed from heat treated steel having a hardness of at least 58-60 Rockwell.

18. The clutch assembly as recited in claim 13, wherein (i) said lever portion of at least one of said plurality of clutch levers is fabricated from heat treated S-7 tool steel having a hardness of at least 58-60 Rockwell, and (ii) said replaceable nose portion at least on of said plurality of clutch levers is fabricated from heat treated CPM-15V tool steel having a hardness of at least 58-60 Rockwell.

19. The clutch assembly as recited in claim 13, wherein said first and second mating surfaces of each of said plurality of clutch levers are tapered such that the replaceable nose piece portion may only slideably engage said lever portion from a single direction.

20. The clutch assembly as recited in claim 13, wherein said first and second mating surfaces of each of said plurality of clutch levers are press fit to form the joint.

21. A centrifugal clutch, the centrifugal clutch comprising:
   a pressure plate, the pressure plate being configured to rigidly coupled with a flywheel of a vehicle engine;
   spacer plate operatively coupled to the pressure plate, wherein the spacer plate is spring biased toward the pressure plate;

a plurality of clutch discs, wherein one of said plurality of clutch discs is configured to selectively engage the spacer plate; and a plurality of clutch levers pivotally connected to the pressure plate by way of a pivot point, each of said plurality of clutch levers having (1) a lever portion, said lever portion having (i) a first aperture adapted to enable said lever portion to be pivotally mounted with respect the pressure plate, and (ii) a first tapered mating surface,
    wherein the lever portion is configured to pivot about a pivot axis, and (2) a replaceable nose piece portion, said replaceable nose piece portion having a second tapered mating surface,
    wherein said second tapered mating surface is (i) complementary to said first tapered mating surface, and (ii) configured to form a joint having an irregular profile with said first tapered mating surface that enables said replaceable nose piece portion to slideably engage said lever portion from a single direction that is substantially parallel to the pivot axis.

\* \* \* \* \*